United States Patent [19]
Midden

[11] Patent Number: 5,480,054
[45] Date of Patent: Jan. 2, 1996

[54] BREW-THROUGH CAP FOR THERMAL CONTAINER

[75] Inventor: William E. Midden, Springfield, Ill.

[73] Assignee: Bunn-O-Matic Corporation, Springfield, Ill.

[21] Appl. No.: 144,307

[22] Filed: Oct. 28, 1993

[51] Int. Cl.[6] .................................................. B65D 51/16
[52] U.S. Cl. .............. 220/202; 220/203.02; 220/203.03; 220/203.21; 220/203.28; 220/203.29; 220/303; 220/373
[58] Field of Search .................................... 220/202, 203, 220/204, 303, 373, 374, 203.02, 203.03, 203.21, 203.28, 203.29; 215/312, 266

[56] References Cited

U.S. PATENT DOCUMENTS

| | | | |
|---|---|---|---|
| 1,529,246 | 3/1925 | Fenn | 220/203 |
| 1,724,878 | 8/1929 | Jensen | 220/203 X |
| 1,923,384 | 8/1933 | Miller | 220/203 X |
| 2,337,046 | 12/1943 | Howard | 220/373 |
| 4,285,440 | 8/1981 | Adams | 220/303 X |
| 4,351,350 | 9/1982 | Crute | 220/204 X |
| 4,666,058 | 5/1987 | Harris | 220/373 |
| 4,736,863 | 4/1988 | Harris | 220/203 |
| 4,739,898 | 4/1988 | Brown | |
| 4,858,787 | 8/1989 | Stone | |
| 5,038,959 | 8/1991 | Patel | |

FOREIGN PATENT DOCUMENTS 1554806  10/1979  United Kingdom ................... 220/203

*Primary Examiner*—Jes F. Pascua
*Attorney, Agent, or Firm*—Trexler, Bushnell, Giangiorgi & Blackstone, Ltd.

[57] ABSTRACT

A lid assembly for use with a beverage container which retains and dispenses beverages therefrom. The container includes a body having a reservoir chamber and a mouth communicating with the reservoir chamber. The lid assembly is cooperatively attachable to the body of the container for selectively closing the mouth. The lid assembly includes an exterior segment and an interior segment which are spaced apart and define a lid chamber therebetween. A breathing vent is provided in the exterior segment for communication between the outside atmosphere and the lid chamber. An anti-spill vent is provided with the vent for preventing leakage of liquid therethrough when the container is tipped. A second vent extends between the interior segment and communicates with the lid chamber for passing atmosphere between the reservoir chamber and the lid chamber.

10 Claims, 3 Drawing Sheets

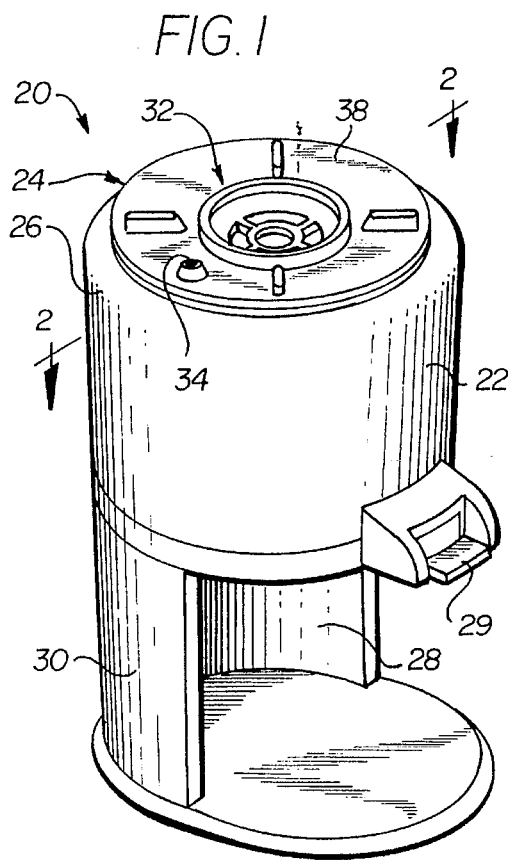
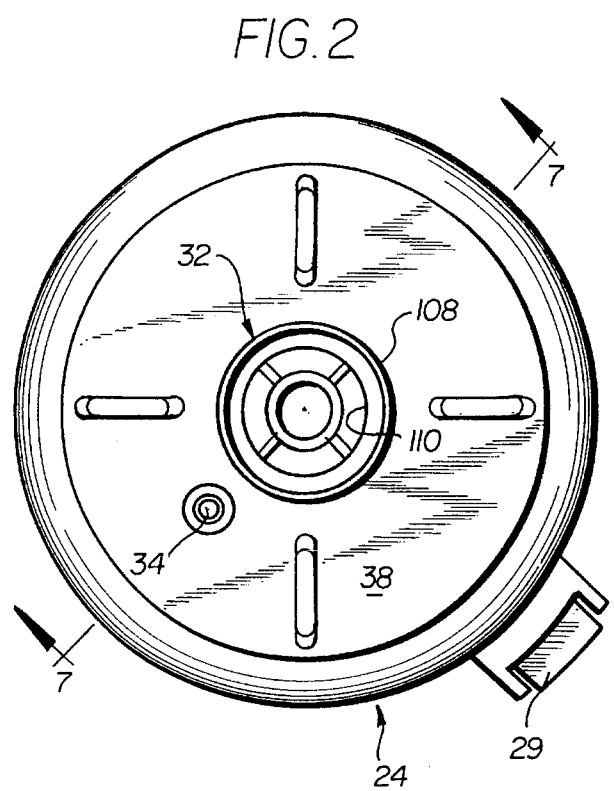
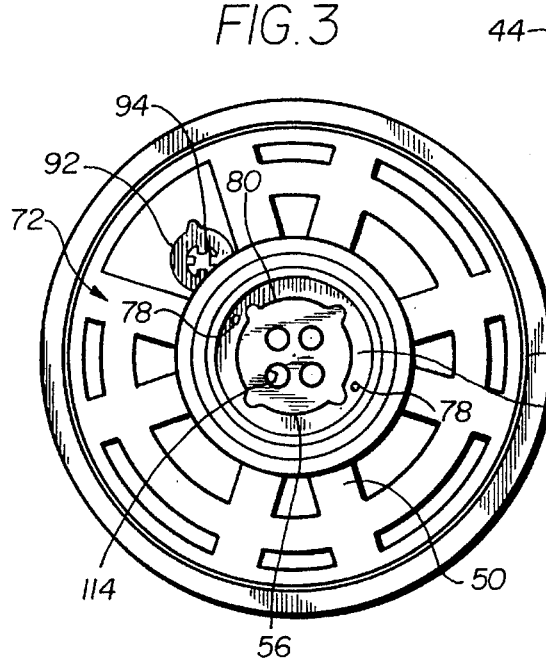
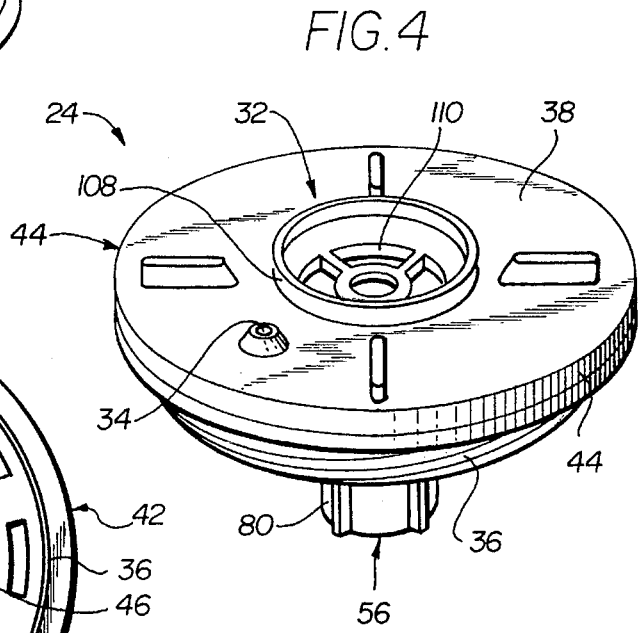

BREW-THROUGH CAP FOR THERMAL CONTAINER

BACKGROUND OF THE INVENTION

The present invention generally relates to beverage dispensing containers and more specifically to a lid assembly for use with beverage dispensing containers.

A variety of beverage dispensing containers are available which include a body portion having a thermal barrier and a lid assembly which attaches to the body portion to prevent the escape of moisture, heat, and to prevent spilling should the container be tipped. An example of such a container and lid assembly can be found in U.S. Pat. No. 5,038,959 to Patel and in U.S. Pat. No. 4,739,898 to Brown. Both of the lid assemblies shown in Patel and Brown allow a brewed beverage to be dispensed into the container through an opening in the top of the lid assembly. Once the beverage is dispensed into the container, the lid assembly prevents the evaporative loss of moisture from the beverage. Additionally, both lid assemblies provide a degree of spill resistance when the container is tipped.

An important factor involved in lid assemblies used with such containers, in addition to and to be balanced with the factors presented above, is that the lid assembly must also allow the body of the container to "breathe" so that beverage may be easily dispensed from the container. Absence of a breathing vent generally results in the development of a vacuum in the container thereby hampering the dispensing of beverage from the container. An example of the vent passage can be found in Patel which provides a vent groove through the mouth of the container. The vent groove communicates with the threads of the lid and with free breathing holes formed through the lid. Threads between the lid and the container are formed with a dimensional deviation to provide an air passage space therebetween to facilitate venting. Additionally, free breathing vent holes formed through the lid allow air to vent freely through the lid.

While Patel provides venting to prevent the development of a vacuum in the container, such vents also facilitate dripping or leaking when the container is tipped. Additionally, the general free breathing nature of the vents in Patel allow unnecessary evaporation over extended periods of time. Evaporation is extremely detrimental to the coffee brewing arts such that the flavor and consistency of the brewed coffee dramatically changes upon evaporative loss of water from the mixture. As such, Patel does not sufficiently balance the compelling factors of venting, spill prevention and evaporation minimization.

OBJECTS AND SUMMARY OF THE INVENTION

An object of the claimed invention, generally stated, is the provision of a lid assembly for beverage dispensing containers of the type which permit a brewed beverage to be dispensed through the lid assembly and into the container while the lid assembly is positioned in place on the container.

Another object of the claimed invention is to provide a lid assembly for a beverage dispensing container which minimizes or prevents evaporative moisture loss.

Still a further object of the present invention is to provide a lid assembly on a beverage dispensing container which allows venting of air through the assembly while dispensing beverage from the container yet prevents evaporative moisture loss.

A further object of the present invention is to provide a lid assembly on a beverage dispensing container which prevents spilling and leaking of the contents of the container when the container is tipped.

Briefly, and in accordance with the foregoing, the claimed invention envisions a lid assembly for use with a beverage container which container retains and dispenses beverages therefrom. The container includes a body having a reservoir chamber and a mouth communicating with the reservoir chamber. The lid assembly is cooperatively attachable to the body of the container for selectively closing the mouth. The lid assembly includes an exterior segment and an interior segment which are spaced apart and define a lid chamber therebetween. A breathing vent is provided in the exterior segment for communication between the outside atmosphere and the lid chamber. An anti-spill vent is provided with the vent for preventing leakage of liquid therethrough when the container is tipped. A second vent extends between the interior segment and communicates with the lid chamber for passing atmosphere between the reservoir chamber and the lid chamber.

BRIEF DESCRIPTION OF THE DRAWINGS

Certain other and more specific objects of the present invention will be apparent to those skilled in the art from the following detailed description of a presently preferred embodiment of the claimed invention taken in connection with the accompanying drawings, wherein:

FIG. 1 is a perspective view of a lid assembly attached to a beverage dispensing container;

FIG. 2 is a top plan view taken along line 2—2 in FIG. 1 showing the top of the lid assembly;

FIG. 3 is a bottom plan view of the lid assembly which is removed from engagement with the beverage dispensing container;

FIG. 4 is a perspective view of the lid assembly removed from the beverage dispensing container;

DETAILED DESCRIPTION OF THE PREFERRED EMBODIMENT

Figure 5:
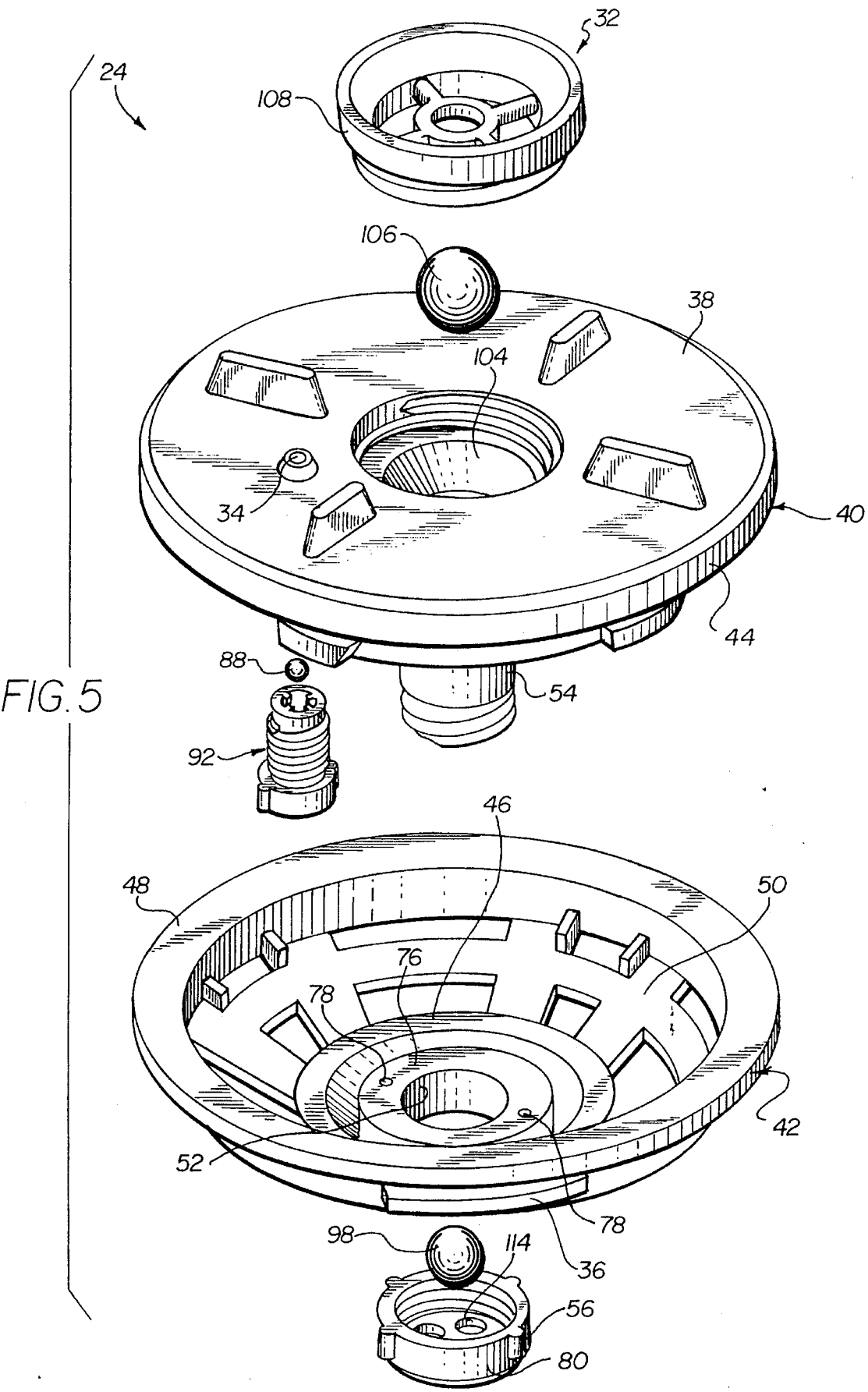
FIG. 5 is an exploded perspective view of the lid assembly as shown in FIG. 4.

With reference to FIG. 1, a beverage dispensing container 20 is shown having a container body portion 22 and a lid assembly 24. The lid assembly 24 attaches to an upper end 26 of the body 22. A cup cavity 28 is provided in a base portion 30 of the container body 22. A cup (not shown) is positioned in the cup cavity 28 and a quantity of beverage retained in the container body 22 may be dispensed therein by operation of a control lever 29. With reference to FIG. 2, the lid assembly 24 includes a brew-through opening 32 and a vent passage 34. The vent 34 includes a first vent inlet port 35, a first vent outlet port 37, and a wall 39 extending therebetween defining a vent cavity or chamber 90. Threads 36 (FIG. 4) are formed on an exterior perimeter of the lid assembly 24 below a top surface 38.

Figure 6:
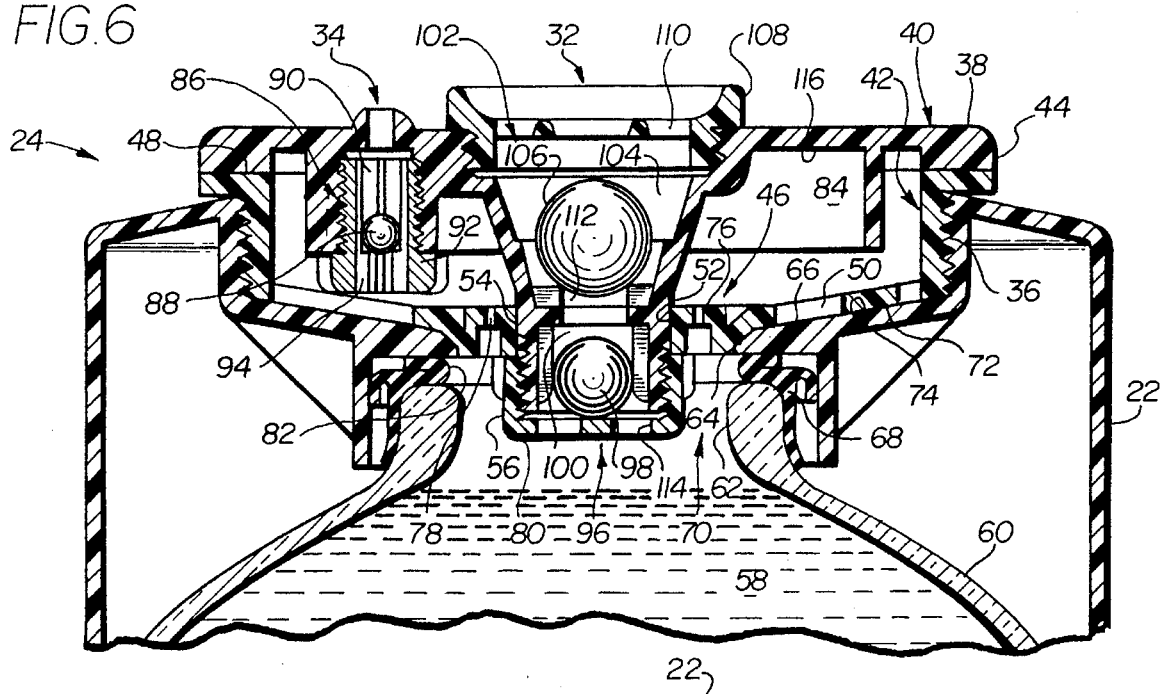
FIG. 6 is a cross-sectional side elevational view of the lid assembly taken along line 6—6 in FIG. 1.
Figure 7:
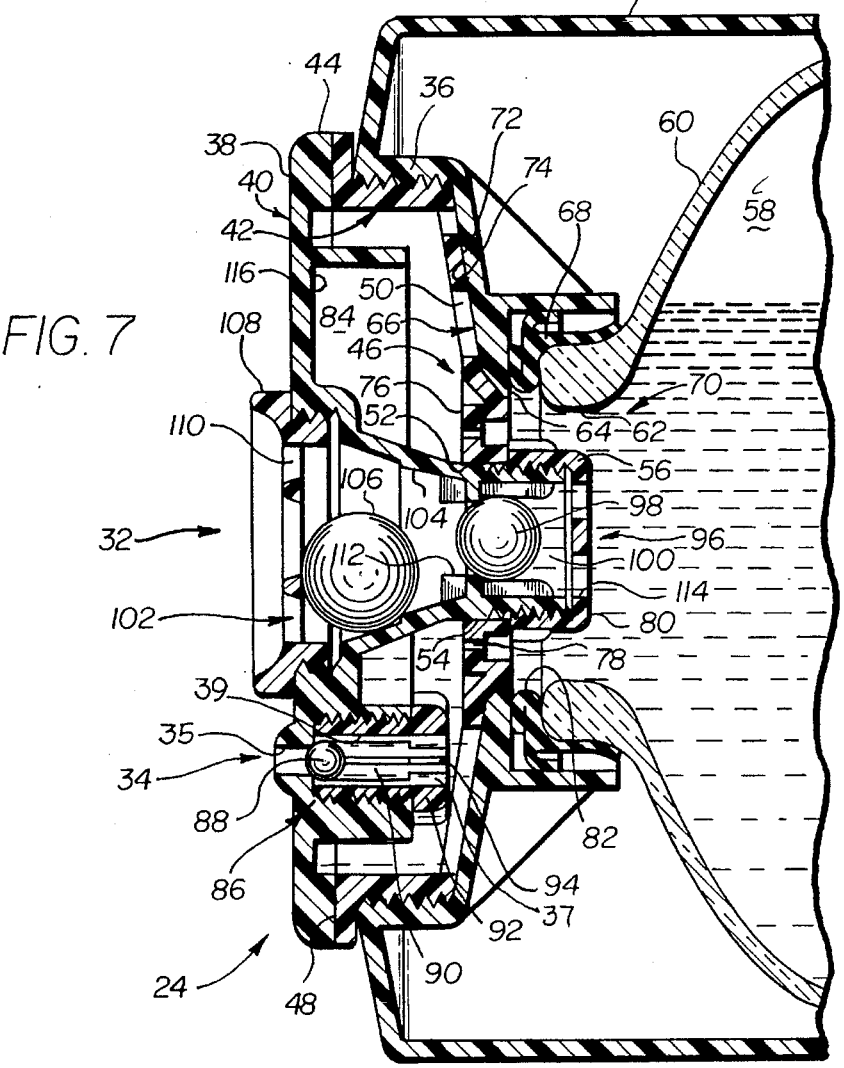
FIG. 7 is a cross-sectional view as shown in FIG. 6 in which the container has been tipped on its side.

With further reference to FIG. 5, the lid assembly 24 is shown in an exploded perspective view. The exploded perspective view shows two primary segments of the lid assembly 24, an exterior segment 40 and an interior segment 42. The exterior segment 40 includes a rim 44 extending downwardly from the top surface 38. The interior segment 42 includes a hub 46 connected to an outer rim 48 by a plurality of spokes 50. The hub 46 of the interior segment 42 has an orifice 52 which mates over a neck 54 extending downwardly from the exterior segment 40. With further reference to FIGS. 6 and 7, the interior segment 42 mates with the underside of the exterior segment 40 with the neck 54 projecting through the orifice 52. The interior segment 42 is secured to the exterior segment 40 by means of a nut cap 56 which threadably engages threads on a free end of the neck 54.

With further reference to FIGS. 6 and 7, the container body is formed with a reservoir chamber 58 in which a desired liquid is disposed. The reservoir chamber 58 is defined by the interior surface of a thermal container 60 retained in the container body 22. The thermal container 60 has an upwardly disposed mouth 62 which communicates with a downwardly disposed mouth 64 of a funnel portion 66. A gasket 68 is disposed between the downwardly disposed mouth 64 of the funnel portion 66 and the upwardly disposed mouth 62 of the thermal container 60. The upwardly and downwardly disposed mouths 62,64 generally define a container mouth 70.

The neck 54 and the attached nut cap 56 extend into the mouth 70. The lid assembly 24 is attached to the body 22 by threadedly engaging the lid threads 36 with cooperatively formed threads 71 on the body 22. The threads 36,71 form a seal against leakage of fluid therethrough. An exterior surface 72 of the interior segment 42 lies against an exterior surface 74 of the funnel portion 66. A portion 76 of the hub 46 has a hole 78 formed therethrough. The hole 78 is positioned on the portion of the hub 46 between an outside surface 80 of the nut cap 56 and an inside surface 82 of the mouth 70. The hole 78 allows communication between the reservoir chamber 58 and a lid chamber 84 defined between the interior segment 42 and the exterior segment 40.

As more clearly shown in FIGS. 6 and 7, the vent passage 34 communicates between the lid chamber 84 and the external atmosphere. Anti-spill means 86 are associated with the vent passage 34 such that a steel ball 88 is retained in a vent cavity 90 by a core segment 92. The steel ball 88 is supported in a lower position on protrusions 94 to allow venting of atmosphere therethrough to prevent the development of a vacuum in the reservoir chamber 58. Atmosphere passes through the vent cavity 90 around the steel ball 88 and through a core orifice 94 to communicate with the lid chamber 84. Atmosphere passes through the holes 78 in the hub 46 to communicate with the reservoir chamber 58. When the container is tipped, the steel ball 88 rolls towards the vent passage 34 to seal the vent passage to prevent liquid from leaking from the container.

Centrally located on the lid assembly 24, the brew-through opening 32 includes anti-spill means 96 which operates in the manner as described hereinabove with regard to the anti-spill means 86. A heavy steel ball 98 is retained in a second cavity 100 below brew-through means 102. The brew-through means includes a conduit 104 formed through the top surface 38 of the exterior segment 40 of the lid assembly 24. The conduit 104 communicates with the second cavity 100. A floating ball 106 is housed in the conduit 104 and retained therein by a retaining cover 108. As shown, the retaining cover 108 has a number of openings or gaps 110 which allow fluid to pass therethrough.

In use, the beverage dispensing container 20 has the lid assembly 24 is attached to the container body 22 overlying and selectively closing the mouth 70. A beverage is brewed and dispensed into the container 20 through the brew-through opening 32 in the lid assembly 24. Brewed beverage passes through the gaps 110 in the retaining cover 108 and into the conduit 104. As beverage accumulates in the conduit 104, the floating ball 106 rises or floats on the accumulated beverage to open a drain opening 112. Fluid drains into the second cavity 100 and passes around the heavy steel ball 98 to drain through the bores 114 in the nut cap 56. The beverage then drains into the reservoir chamber 58 for selective dispensing.

The interior segment 42 of the lid assembly and the threads 36,71 seal against the funnel portion 66 except for the hub 46. The holes 78 formed through the hub 46 communicate with the reservoir chamber 58 and the lid chamber 84. The vent passage 34 and core orifice 94 communicate with the lid chamber 84 and the external atmosphere. As such, when a beverage is dispensed from the reservoir 58, air is drawn through the vent passage 34 and core orifice 94 into the lid chamber 84, through the holes 78 and into the reservoir 58. Similarly, when a beverage is dispensed into the container, beverage dispensed therein displaces atmosphere in the reservoir 58. The displaced atmosphere passes from the reservoir 58 through the holes 78 into the lid chamber 84 and through the core orifice 94 and vent passage 34.

The tortious path created by the holes, orifices and passages 78,94,34 and associated lid chamber 84 prevent evaporative losses of moisture and help prevent spilling when the container is tipped. Additionally, atmosphere which does pass through the holes 78 into the lid chamber 84 tends to lose a substantial portion of the moisture it carries since the moisture tends to condense on an interior surface 116 of the exterior segment 40. The condensate then drips down onto the interior segment 42 and funnel portion 66 to drain into the reservoir chamber 58 through the holes 78. The small diameter of the holes 78 tend to be temporarily sealed by an accumulation of condensate, thereby preventing further evaporation from the reservoir chamber 58.

When the container is tipped, as shown in FIG. 7, the steel balls 88,98 roll into position to block the corresponding vent passage 34 and drain 112. As such, fluid is prevented from flowing out through these openings 34,112. As mentioned hereinabove, the threads 36,71 seal the interior segment 42 against the container body 22 thereby preventing dripping through the threads. A small amount of fluid may pass through the holes 78, but the small diameter of these holes 78 minimize the amount of fluid which passes through into the lid chamber 84 and also allow the fluid to drain back into the reservoir 58 once the container is righted. If the container is not righted for a long period of time, any fluid which does accumulate in the lid chamber 84 will drain back into the reservoir 58 once the container is righted.

It is to be noted that those skilled in the art and possessed of the present disclosure of the invention will conceive numerous modifications and variations based upon this inventive concept. Insofar as these modifications and variations are covered by the claims appended hereto, they shall be deemed to fall within the spirit and scope of the invention.

The invention claimed is:

1. A beverage container for retaining beverages, said container comprising:

a body having a reservoir chamber therein;

a portion of said body having a mouth formed therethrough communicating with said reservoir chamber;

a lid assembly attached to said body of said container for covering said mouth;

an exterior segment and an interior segment of said lid assembly, said exterior and interior segments being spaced apart and defining a lid chamber therebetween;

a first vent attached to said exterior segment communicating with ambient atmosphere and said lid chamber, said first vent having a first inlet port communicating with ambient atmosphere, a first outlet port communicating with said lid chamber, and a wall extending therebetween defining a first vent cavity;

vent anti-spill means including said first vent chamber of said first vent for preventing leakage of liquid therethrough when said container is tipped; and a second vent in said interior segment communicating with said lid chamber and said reservoir chamber for passing atmosphere between said reservoir chamber and said lid chamber, said first vent being offset from said second vent.

2. A beverage container for retaining beverages as recited in claim 1, said first vent means further including a vent passage formed through a surface of said exterior segment and a core segment defining a vent cavity extending inwardly into said lid chamber communicating with said vent passage, a core orifice formed through said core segment communicating with said lid chamber, said anti-spill means including a weighted spherical body retained in said vent cavity between said vent passage and said core orifice, whereby upon tipping said container, said weighted spherical body moves through said vent cavity to block said vent passage to prevent liquids from leaking therethrough.

3. A beverage container for retaining and dispensing beverages as recited in claim 1 further including brew-through means including in said lid assembly, said brew-through means including a conduit communicating with said reservoir chamber and said ambient atmosphere and a floatable spherical body positioned in said conduit, a drain disposed through a wall of said conduit communicating with said reservoir chamber for draining fluid from said conduit into said reservoir chamber, whereupon dispensing a quantity of beverage into said conduit said floatable spherical body rises on an accumulation of fluid in said conduit to disengage said floatable spherical body from the drain to allow the beverage to drain from the conduit into the reservoir chamber.

4. A beverage container for retaining beverages as recited in claim 3, said first vent further including a vent passage formed through a surface of said exterior segment and a core segment defining a vent cavity extending inwardly into said lid chamber communicating with said vent passage, a core orifice formed through said core segment communicating with said lid chamber, said anti-spill means including a weighted spherical body retained in said vent cavity between said vent passage and said core orifice, whereby upon tipping said container, said weighted spherical body moves through said vent cavity to block said vent passage to prevent liquids from leaking therethrough.

5. A beverage container as recited in claim 1, further comprising:

a filling passage in said exterior and interior segments for dispensing fluid into said reservoir chamber through said lid assembly;

spill-resistant means included in with said filling passage for preventing leakage of liquid therethrough when said container is tipped; and anti-evaporation means included in said filling passage for preventing evaporative loss of moisture from beverage retained in said reservoir chamber through said filling passage.

6. A lid assembly for use with a beverage container, said container including a body having a reservoir chamber therein, a portion of said body having a mouth formed therethrough communicating with said reservoir chamber, said lid assembly being attachable to said body of said container covering said mouth, said lid assembly comprising:

an exterior segment and an interior segment, said exterior and interior segments being spaced apart and defining a lid chamber therebetween;

a first vent attached to said exterior segment communication with ambient atmosphere and said lid chamber, said first vent having a first inlet port communicating with ambient atmosphere, a first outlet port communicating with said lid chamber, and a wall extending therebetween defining a first vent cavity;

vent anti-spill means included in said first vent for preventing leakage of liquid therethrough when said container is tipped; and a second vent formed in said interior segment and communicating with said lid chamber and said reservoir for passing atmosphere between said reservoir chamber and said lid chamber, said first vent being offset relative to said second vent.

7. A lid assembly for use with a beverage container as recited in claim 6, said first vent means further including a vent passage formed through a surface of said exterior segment and a core segment defining a vent cavity extending inwardly into said lid chamber communicating with said vent passage, a core orifice formed through said core segment communicating with said lid chamber, said anti-spill means including a weighted spherical body retained in said vent cavity between said vent passage and said core orifice, whereby upon tipping said container, said weighted spherical body moves through said vent cavity to block said vent passage to prevent liquids from leaking therethrough.

8. A lid assembly for use with a beverage container as recited in claim 6, further including brew-through means included in said lid assembly, said brew-through means including a conduit communicating with said reservoir chamber and said ambient atmosphere and a floatable spherical positioned in said conduit, a drain disposed through a wall of said conduit communicating with said reservoir chamber for draining fluid from said conduit into said reservoir chamber, whereupon dispensing a quantity of beverage into said conduit said floatable spherical body rises on an accumulation of fluid in said conduit to disengage said floatable spherical body from the drain to allow the beverage to drain from the conduit into the reservoir chamber.

9. A lid assembly for use with a beverage container as recited in claim 8, said first vent means further including a vent passage formed through a surface of said exterior segment and a core segment defining a vent cavity extending inwardly into said lid chamber communicating with said vent passage, a core orifice formed through said core segment communicating with said lid chamber, said anti-spill means including a weighted spherical body retained in said vent cavity between said vent passage and said core orifice, whereby upon tipping said container, said weighted spherical body moves through said vent cavity to block said vent passage to prevent liquids from leaking therethrough.

10. A lid assembly for use with a beverage container as recited in claim 6, further comprising:

a filling passage in said exterior and interior segments for dispensing fluid into said reservoir chamber through said lid assembly;

spill-resistant means included in said filling passage for preventing leakage of liquid therethrough when said container is tipped with said lid assembly attached thereto; and anti-evaporation means included in said filling passage for preventing evaporative loss of moisture from beverage retained in said reservoir chamber through said filling passage.

\* \* \* \* \*

UNITED STATES PATENT AND TRADEMARK OFFICE
CERTIFICATE OF CORRECTION

PATENT NO. : 5,480,054
DATED : January 2, 1996
INVENTOR(S) : William E. Midden

It is certified that error appears in the above-indentified patent and that said Letters Patent is hereby corrected as shown below:

Column 6, Line 54 "spherical positioned" should read
  --spherical body positioned --

Signed and Sealed this

Twenty-fifth Day of June, 1996

Attest:

BRUCE LEHMAN

Attesting Officer  Commissioner of Patents and Trademarks